US008947982B2

(12) United States Patent
Lee et al.

(10) Patent No.: US 8,947,982 B2
(45) Date of Patent: Feb. 3, 2015

(54) METHOD AND APPARATUS FOR SETTING ALARM IN PORTABLE TERMINAL

(71) Applicant: Samsung Electronics Co. Ltd., Suwon-si, Gyeonggi-do (KR)

(72) Inventors: Jun-Hyuk Lee, Seoul (KR); Ho-Cheol Seo, Suwon-si (KR); San Cho, Suwon-si (KR); Ji-Man Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 118 days.

(21) Appl. No.: 13/713,557

(22) Filed: Dec. 13, 2012

(65) Prior Publication Data

US 2013/0148474 A1 Jun. 13, 2013

(30) Foreign Application Priority Data

Dec. 13, 2011 (KR) ........................ 10-2011-0133695

(51) Int. Cl.

*G04C 23/00* (2006.01)
*G04G 13/02* (2006.01)
*H04M 1/725* (2006.01)
*H04M 1/663* (2006.01)

(52) U.S. Cl.

CPC ......... *G04G 13/025* (2013.01); *H04M 1/72566* (2013.01); *H04M 1/72552* (2013.01); *H04M 1/663* (2013.01); *H04M 2250/60* (2013.01)

USPC ........................................................... 368/73

(58) Field of Classification Search

CPC ... G04G 13/025; G04G 13/02; G04G 13/021; G04G 13/023; G04C 3/14

USPC ............. 368/72–74, 4, 10, 13, 250–251, 244, 368/247, 256, 262–263, 107–109

See application file for complete search history.

(56) References Cited

U.S. PATENT DOCUMENTS

| | | | | |
|---|---|---|---|---|
| 8,508,358 | B2 * | 8/2013 | Seo et al. | 340/539.11 |
| 8,553,502 | B2 * | 10/2013 | Lazaridis et al. | 368/109 |
| 2008/0182556 | A1 | 7/2008 | Kozam | |

FOREIGN PATENT DOCUMENTS

| | | | |
|---|---|---|---|
| EP | 1 542 439 | A1 | 6/2005 |
| EP | 2 034 431 | A1 | 3/2009 |
| EP | 2 587 746 | A1 | 5/2013 |
| KR | 10-2004-0040549 | A | 5/2004 |
| WO | 2009/082089 | A2 | 7/2009 |

* cited by examiner

*Primary Examiner* — Edwin A. Leon

(74) *Attorney, Agent, or Firm* — Jefferson IP Law, LLP

(57) ABSTRACT

A method and apparatus for setting an alarm in a portable terminal are provided. The method includes receiving a message for requesting the setting of the alarm from a peer terminal, confirming a right of the peer terminal to set an alarm, determining, if the peer terminal has the right to set the alarm, an alarm generation time according to a transmission time of the alarm setting request message, and setting the alarm for the alarm generation time.

18 Claims, 4 Drawing Sheets

METHOD AND APPARATUS FOR SETTING ALARM IN PORTABLE TERMINAL

PRIORITY

This application claims the benefit under 35 U.S.C. §119 (a) of a Korean patent application filed in the Korean Intellectual Property Office on Dec. 13, 2011 and assigned Serial No. 10-2011-0133695, the entire disclosure of which is hereby incorporated by reference.

BACKGROUND OF THE INVENTION

1. Field of the Invention

The present invention relates to a portable terminal. More particularly, the present invention relates to a method and apparatus for setting an alarm in a portable terminal.

2. Description of the Related Art

With the rapid growth of communication technology, portable terminals capable of wireless communication and information exchange have become increasingly used for daily activities and various applications, and to cope with such a trend, vendors of the portable terminals are conducting research to provide more various applications to the increasing number of portable terminal users.

Portable terminals may provide an alarm function for managing user schedules. The alarm function allows a user to generate a specific audio signal or vibration at a specific time in order to announce to or notify the user that the specific time has arrived. Although the alarm function has an advantage in that a pre-set schedule is announced to the user, it is inconvenient for the user since the user has to directly set an alarm generation condition. That is, the alarm function may require the user to recognize the specific schedule in advance, and directly set the alarm generation time for the schedule via a direct input to the portable terminal. If the user fails to recognize the specific schedule in advance or if the user does not directly set the alarm generation function for the schedule, even though the specific schedule is recognized, the alarm function cannot be used. Therefore, there may be a case where the user may forget the specific schedule.

Accordingly, there is a need to provide an alarm function for satisfying a need of a user who desires a more convenient function.

Therefore, a need exists for a system and method for performing a self diagnosis of a device without the inconvenience caused when manually selecting a self diagnosis item from a computer or a user interface.

SUMMARY OF THE INVENTION

Aspects of the present invention are to address at least the above-mentioned problems and/or disadvantages and to provide at least the advantages described below. Accordingly, an aspect of the present invention is to provide a method and apparatus for setting an alarm in a portable terminal.

Another aspect of the present invention is to provide a method and apparatus for setting an alarm by using a transmission and/or reception message in a portable terminal.

Another aspect of the present invention is to provide a method and apparatus for determining an alarm generation time by using a response time in response to a message received from a peer terminal in a portable terminal.

Another aspect of the present invention is to provide a method and apparatus for determining an alarm setting right of a peer terminal by using a message transmission and/or reception count in a portable terminal.

In accordance with an aspect of the present invention, a method for setting an alarm in a portable terminal is provided. The method includes receiving a message for requesting the setting of the alarm from a peer terminal, confirming a right of the peer terminal to set an alarm, determining, if the peer terminal has the right to set the alarm, an alarm generation time according to a transmission time of the alarm setting request message, and setting the alarm for the alarm generation time.

In accordance with another aspect of the present invention, a method of requesting an alarm setting in a portable terminal is provided. The method includes determining whether an alarm setting function is selected while operating in a message input mode, displaying, if the alarm setting function is selected, at least one symbol pre-set for the alarm setting, selecting at least one symbol according to a user control, and transmitting a message including the selected symbol to a peer terminal In accordance with another aspect of the present invention, an apparatus for setting an alarm in a portable terminal is provided. The apparatus includes a transceiver for receiving a message for requesting the setting of the alarm from a peer terminal, and a controller for confirming a right of the peer terminal to set the alarm, and if the peer terminal has the right to set the alarm, for determining an alarm generation time according to a transmission time of the alarm setting request message, and for setting the alarm for the alarm generation time.

In accordance with another aspect of the present invention, an apparatus for requesting an alarm setting in a portable terminal is provided. The apparatus includes a controller for determining whether an alarm setting function is selected while operating in a message input mode, and for selecting, if the alarm setting function is selected while operating in the message input mode, at least one symbol according to a user control by displaying at least one symbol pre-set for the alarm setting, and a transceiver for transmitting a message including the selected symbol to a peer terminal under the control of the controller.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Also, the terms used herein are defined according to the functions of the exemplary embodiments. Thus, the terms may vary depending on user's or operator's intention and usage. That is, the terms used herein must be understood based on the descriptions made herein.

The exemplary embodiments described hereinafter relate to a method and apparatus for setting an alarm by using a transmission and/or reception message in a portable terminal. The portable terminal described hereinafter includes a mobile communication terminal capable of transmitting and receiving a message. Examples of the portable terminal include a Personal Digital Assistant (PDA), a laptop, a smart phone, a net-book, a Mobile Internet Device (MID), an Ultra Mobile Personal Computer (UMPC), a tablet Personal Computer (PC), or any other similar or suitable electronic device.

In the following description of the exemplary embodiments, a message transmitted and received by using an instant messenger, which uses the Internet or other similar communications networks, will be described for exemplary purposes. However, the present invention is not limited thereto, and the message may be transmitted and received by using a Short Message Service (SMS), a Multimedia Message Service (MMS), or any other similar and/or suitable message delivery or communication system.

Figure 1:
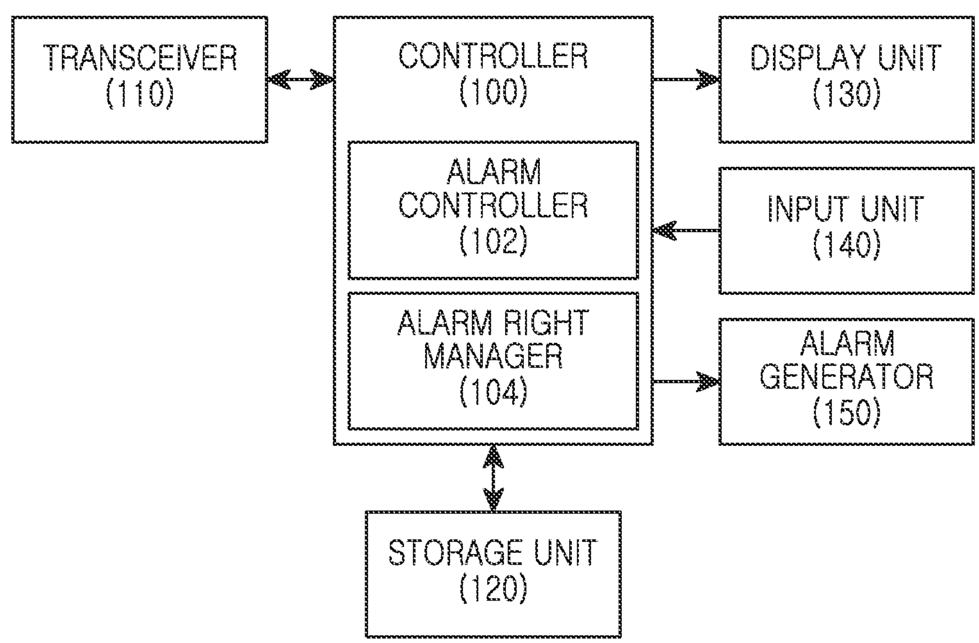
FIG. 1 is a block diagram illustrating a structure of a portable terminal according to an exemplary embodiment of the present invention.

FIG. 1 is a block diagram illustrating a structure of a portable terminal according to an exemplary embodiment of the present invention. The portable terminal may be an electronic device such as, for example, a laptop, a smart phone, a net book, a mobile internet device, an ultra mobile PC, a tablet personal computer, a mobile telecommunication terminal, PDA having a camera and the like herein, just to name some of the possibilities.

Referring to FIG. 1, the portable terminal includes a controller 100, a transceiver 110, a storage unit 120, a display unit 130, an input unit 140, and an alarm generator 150. In particular, the controller 100 includes an alarm controller 102 and an alarm right manager 104.

The controller 100 controls and processes an overall operation of the portable terminal. In particular, by including the alarm controller 102 and the alarm right manager 104, the controller 100 controls and processes a function for requesting a peer terminal to set an alarm by using a transmission message or a function for setting the alarm according to an alarm setting request message received from the peer terminal.

More specifically, when an alarm setting function is selected in a message input mode of the portable terminal, the alarm controller 102 controls and processes a function for displaying at least one pre-set alarm emoticon, or any other suitable icon or image, on the display unit 130 and for selecting one alarm emoticon according to a user control. After selecting one pre-set alarm emoticon, the alarm controller 102 controls and processes a function for transmitting the selected alarm emoticon to the peer terminal. In this case, if a message, which is input by the user, is present in a message input window, then the alarm controller 102 controls and processes the function for transmitting the selected alarm emoticon together with the user input message. Furthermore, if an alarm time is not designated by the selected alarm emoticon, that is, if the emoticon requires an alarm time designation of the user, the alarm controller 102 controls and processes a function for receiving an alarm generation time from the user, and controls and processes a function for mapping the input alarm generation time to the emoticon and for transmitting the mapping result to the peer terminal. Furthermore, the alarm controller 102 may control and process a function for transmitting another emoticon, such as an emoticon indicating weather or an emotion, or any other similar or suitable emoticon or image, together with the alarm emoticon by the user control.

In addition, upon receiving a message including the alarm emoticon from the peer terminal in a state where a message-based alarm setting function is activated, then the alarm controller 102 determines whether the peer terminal has a right, i.e., permission, to set the alarm by using the alarm right manager 104. If the peer terminal has the right to set the alarm, then the alarm controller 102 determines the alarm generation time indicated by the alarm emoticon, and sets an alarm for the determined alarm generation time. In this case, the alarm controller 102 performs a function for detecting whether a pre-set operation is performed before the alarm generation time arrives, and if the pre-set operation is performed, for canceling the set alarm. Otherwise, if the pre-set operation is not performed before the alarm generation time arrives, then the alarm controller 102 controls and processes a function for maintaining the alarm setting state, and if the alarm generation time arrives, for generating the pre-set alarm. Herein, the pre-set operation may be an operation of confirming a specific message by the user or an operation of transmitting a response message in response to the specific message according to the user control.

In order to determine the alarm generation time indicated by the alarm emoticon, the alarm controller 102 confirms whether the alarm emoticon designates the alarm time. If a specific alarm time is designated by the alarm emoticon, then the specific alarm time may be determined to be the alarm generation time. Herein, the alarm emoticon may designate a time, which is later than a message transmission time by a predetermined time, as the alarm time, or may designate a specific time as the alarm time. For example, the alarm emoticon may indicate a time interval (e.g., 5 minutes, 10 minutes, or any desired amount of time) for a desired alarm generation time with respect to the message transmission time, or may directly indicate the alarm generation time such as "YYYY/

MM/DD, 00(hour):00(minute)", wherein "YYYY" is a year, "MM" is a month of the year, and "DD" is a date of the month. Therefore, the alarm controller 102 may determine the alarm generation time by using an alarm time type indicated by the alarm emoticon.

Otherwise, if the alarm emoticon does not designate the specific alarm time, the alarm controller 102 may determine the alarm generation time with respect to a default time interval, or may determine the alarm generation time with respect to a response time of a message transmitted and received with respect to the peer terminal That is, the alarm controller 102 may calculate a response time, which is a time required until the terminal transmits its response message in response to a message received from the peer terminal and stored in the storage unit 120, and may determine the alarm generation time by using the calculated response time. In this case, if the message is transmitted and received multiple times, with respect to the peer terminals, then the alarm controller 102 may determine the alarm generation time by using an average response time of the message that is transmitted and received multiple times.

In particular, instead of calculating the average response time for all messages that are transmitted and received multiple times, the alarm controller 102 may group the messages that are transmitted and received multiple times according to a predetermined time, and may determine the alarm generation time by using the average response time for first messages belonging to respective groups. Herein, according to a characteristic of an instant message, if a first response message for a reception message is transmitted, then a response message is transmitted within a very short time within a predetermined time period. Thus, the reason of grouping the messages is not in consideration of the short response time. In addition, even if the response time for the reception message exceeds a threshold time according to a design rule, the response time may not be considered in the calculation of the alarm generation time by handling such a response time exceeding the threshold time as an exceptional case.

In addition, upon receiving a message including an alarm emoticon from the peer terminal in a state where the message-based alarm setting function is not activated, then the alarm controller 102 may ignore the alarm emoticon or activate the alarm setting function in order to notify the user about the received message and inquire whether to set the alarm. Thus, in such a case, the alarm controller 102 may perform a corresponding operation according to a user response. That is, the alarm controller 102 controls and processes a function for confirming an alarm setting right of the peer terminal that sent the message and for setting the alarm indicated by the alarm emoticon by either ignoring the alarm emoticon when the user does not desire to activate the alarm setting function, or by activating the alarm setting function when the user desires to activate the alarm setting function.

In addition, if a different emoticon is included in the message that includes the alarm emoticon received from the peer terminal, then the alarm controller 102 controls and processes a function for performing an operation corresponding to the different emoticon, at the alarm generation time that corresponds to the alarm emoticon, by analyzing the different emoticon. For example, if the different emoticon is an emoticon for indicating rainy weather, a rain sound may be generated at the alarm generation time, or a rain image may be displayed on a screen, or an application capable of determining weather conditions may be automatically executed. For another example, if the different emoticon indicates a happy facial expression, a sound for expressing a happy emotion may be generated at the alarm generation time or an image for expressing the happy emotion may be displayed on the screen.

Next, the alarm right manager 104 determines whether the peer terminal has a right, i.e., permission, to set an alarm. The alarm right manager 104 may determine whether the peer terminal has the right to set the alarm by examining whether the number of times of receiving and transmitting a message, with respect to the peer terminal, is greater than or equal to a pre-set threshold count. That is, if the number of times of transmitting and receiving the message, with respect to the peer terminal, is greater than or equal to the pre-set threshold count, then the alarm right manager 104 determines that the peer terminal is a terminal having the right to set the alarm. Otherwise, if the number of times of transmitting and receiving the message, with respect to the peer terminal, is less than the pre-set threshold count, then the alarm right manager 104 determines that the peer terminal is a terminal not having the right to set the alarm. Of course, if the peer terminal is predetermined as a terminal having the right to set the alarm, according to the user's control, then the alarm right manager 104 may determine that the peer terminal is a terminal having the right to set the alarm, irrespective of the number of times of transmitting and receiving the message with respect to the peer terminal Herein, the alarm right manager 104 may determine the number of times of the transmitting and receiving of the message, with respect to the peer terminal, on the basis of the transmitted and received messages stored in the storage unit 120.

The transceiver 110 transmits and receives a signal with respect to the peer terminal under the control of the controller 100. That is, the transceiver 110 transmits a signal provided from the controller 100 to the peer terminal, and provides the controller 100 with a signal received from the peer terminal. For example, the transceiver 110 transmits a message for requesting an alarm setting to the peer terminal under the control of the controller 100, and receives the message for the requesting of the alarm setting from the peer terminal and then provides the received message to the controller 100.

The storage unit 120 stores a variety of programs and data for operations of the controller 100, and stores the messages transmitted and received with respect to the peer terminal. In particular, the storage unit 120 stores a pre-set alarm emoticon for the alarm setting. The alarm emoticon may be mapped to an alarm time interval when stored.

The display unit 130 displays a variety of status information, texts, and images generated while the portable terminal is operating under the control of the controller 100. In particular, the display unit 130 displays a message transmission and/or reception screen under the control of the controller 100, and displays an alarm emoticon and other emoticons. In addition, the display unit 130 displays an image corresponding to other emoticons included in a received message for requesting the alarm setting under the control of the controller 100.

The input unit 140 includes at least one key and a touch sensor, and thus provides data corresponding to a key pressed by the user to the controller 100 or provides coordinate data corresponding to a location touched by the user to the controller 100. In particular, the input unit 140 receives, from the user, a message to be transmitted to the peer terminal and then provides the received message to the controller 100. Furthermore, the input unit 140 selects an alarm emoticon and provides data for indicating the selected alarm emoticon to the controller 100. The alarm generator 150 outputs a pre-set audio signal or generates a vibration under the control of the controller 100.

The method described above in relation with FIG. 1 under of the present invention may be provided as one or more instructions in one or more software modules stored in the respective portable terminals.

Figure 2:
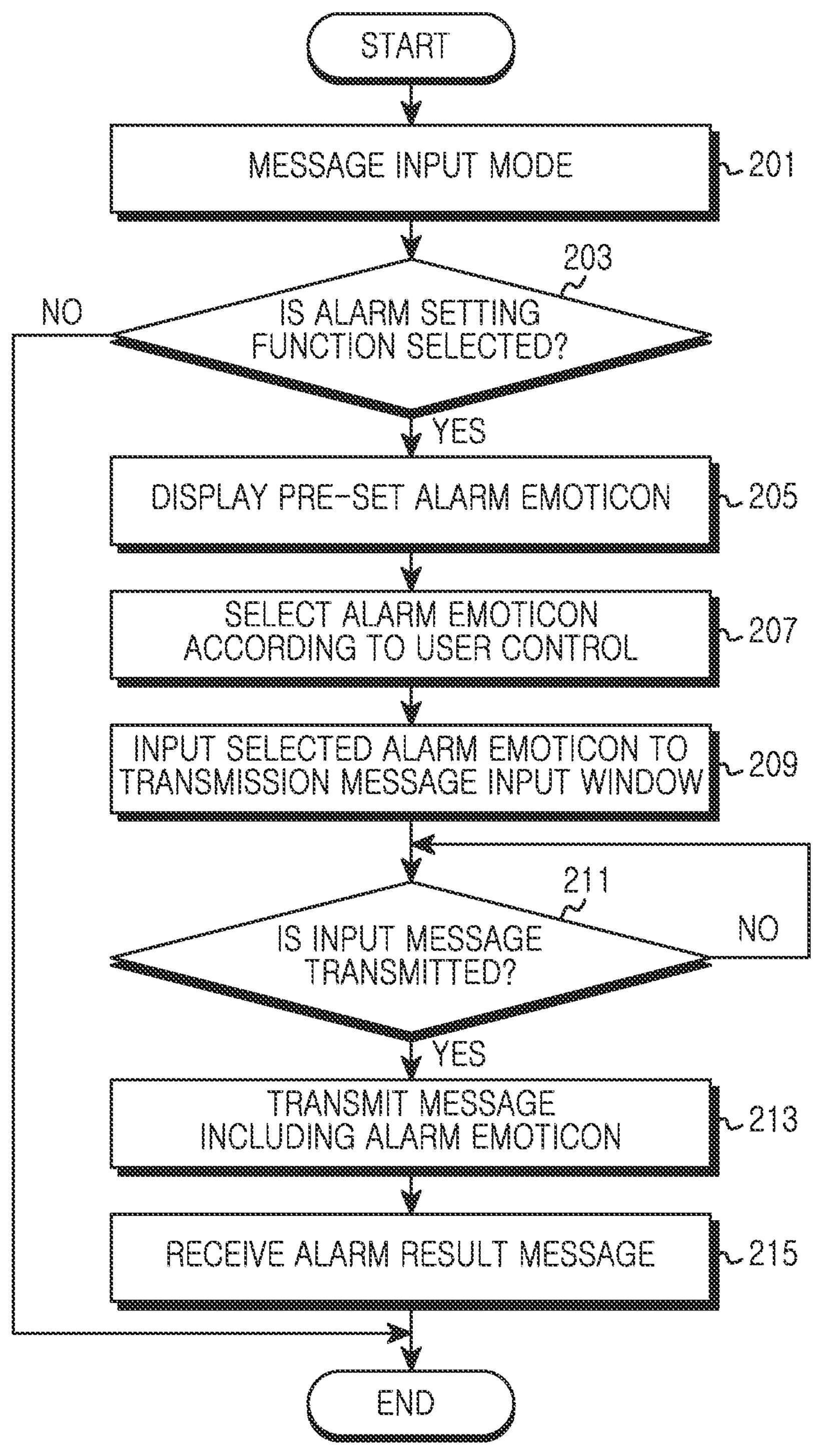
FIG. 2 is a flowchart illustrating an operation for requesting an alarm setting in a portable terminal according to an exemplary embodiment of the present invention.

FIG. 2 is a flowchart illustrating an operation for requesting an alarm setting in a portable terminal according to an exemplary embodiment of the present invention.

Figure 4:
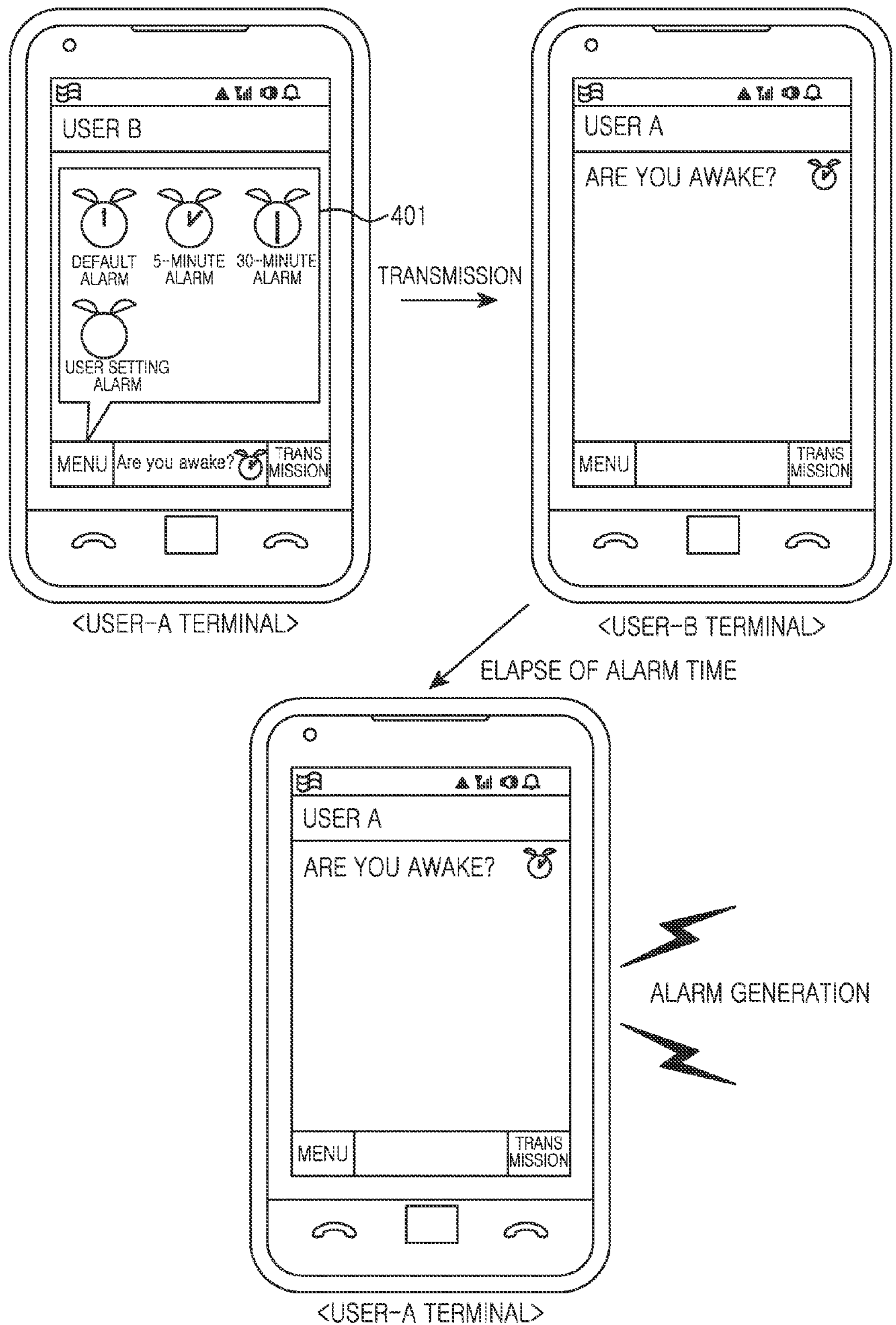
FIG. 4 illustrates a configuration of a screen for setting an alarm in a portable terminal according to an exemplary embodiment of the present invention.

FIG. 4 illustrates a configuration of a screen for setting an alarm in a portable terminal according to an exemplary embodiment of the present invention.

Referring to FIGS. 2 and 4, the portable terminal enters a message input mode according to a user control in step 201. In step 203, the portable terminal determines whether an alarm setting function is selected while operating in the message input mode that was entered into in step 201. Herein, the alarm setting function implies a function for setting an alarm by transmitting a message to a peer terminal. If the alarm setting function is not selected while the portable terminal is operating in the message input mode, then the procedure of FIG. 2 ends.

Otherwise, if the alarm setting function is selected while the portable terminal is operating in the message input mode, the procedure of FIG. 2 goes on to step 205, and the portable terminal displays a pre-set alarm emoticon. Herein, if a plurality of alarm emoticons is set in the portable terminal, each alarm emoticon may designate a different alarm time or may designate an alarm time by a user setting. In step 207, the portable terminal selects the alarm emoticon according to the user control. In step 209, the portable terminal inputs the selected alarm emoticon to a transmission message input window. For example, as illustrated in FIG. 4, showing a screen of a user-A terminal, alarm emoticons for indicating a default alarm, a 5-minute alarm, a 30-minute alarm, and a user setting alarm may be displayed. Among the four alarm emoticons, an alarm emoticon for indicating the 5-minute alarm is selected by the user and is then displayed in the transmission message input window. Herein, the default alarm, the 5-minute alarm, and the 30-minute alarm imply that an alarm is generated after a specific time (e.g., after a default time, 5 minutes, 30 minutes, or another amount of time) elapses from a time at which the message including a corresponding alarm emoticon is transmitted to the peer terminal. In addition, the user setting alarm may indicate a time designated by the user as an alarm time.

In step 211, the portable terminal determines whether an input message transmission menu is selected by the user. If the input message transmission menu is selected, then, in step 213, the portable terminal transmits a message including the alarm emoticon to the peer terminal. Herein, the portable terminal may additionally select other emoticons for expressing weather conditions, emotion, or other similar emoticons or icons, in addition to the alarm emoticon according to the user control, and thus can transmit the selected emoticon to the peer terminal together with the alarm emoticon.

In step 215, the portable terminal receives an alarm result message from the peer terminal. In this case, the alarm result message may be a message for indicating to the peer terminal whether an alarm is correctly set. In addition, the alarm result message may be a message for indicting whether the alarm is canceled by having a user of the peer terminal confirm the transmitted message before generation of the alarm corresponding to the alarm emoticon, or may be a message for indicating that the alarm is generated in the peer terminal. Thereafter, the procedure of FIG. 2 ends.

Figure 3:
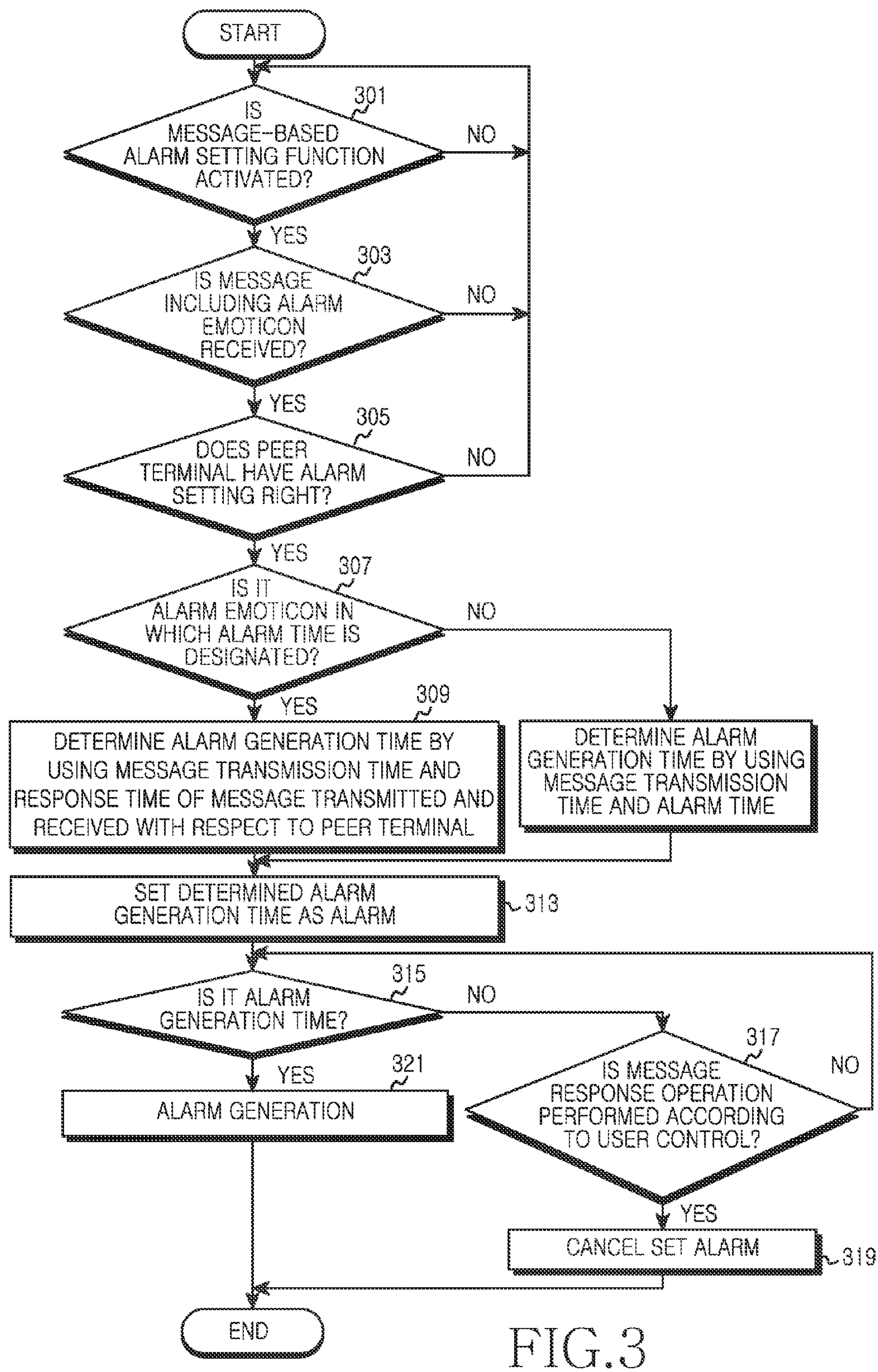
FIG. 3 is a flowchart illustrating a process of setting an alarm in a portable terminal at the request of a peer terminal according to an exemplary embodiment of the present invention.

FIG. 3 is a flowchart illustrating a process of setting an alarm in a portable terminal at the request of a peer terminal according to an exemplary embodiment of the present invention.

Referring to FIGS. 3 and 4, the portable terminal determines whether a message-based alarm setting function is activated in step 301. The message-based alarm setting function is a function for allowing the peer terminal having a right, i.e., permission, to set an alarm of the portable terminal. If the message-based alarm setting function is not activated, the procedure returns to step 301.

Otherwise, if the message-based alarm setting function is activated, then, in step 303, the portable terminal determines whether a message including an alarm emoticon is received from the peer terminal. If the message including the alarm emoticon is not received from the peer terminal, then the procedure of FIG. 3 returns to step 301.

Otherwise, if the message including the alarm emoticon is received from the peer terminal, then, in step 305, the portable terminal determines whether the peer terminal has the right to set the alarm of the portable terminal. Herein, the portable terminal may determine whether the peer terminal has the right to set the alarm by determining whether the number of times of transmitting and receiving a message, with respect to the peer terminal, is greater than or equal to a pre-set threshold count. That is, if the number of times of transmitting and receiving the message, with respect to the peer terminal, is greater than or equal to the pre-set threshold count, then the portable terminal determines that the peer terminal has the right to set the alarm. Otherwise, if the number times of transmitting and receiving the message, with respect to the peer terminal, is less than the per-set threshold count, then the portable terminal determines that the peer terminal does not have the right to set the alarm. In addition, if the peer terminal is predetermined to be a terminal having the right to set the alarm according to the user control, then the portable terminal may determine that the peer terminal has the right to set the alarm, irrespective of the number of times of transmitting and receiving the message with respect to the peer terminal.

If the determination result of step 305 shows that the peer terminal has no right to set the alarm of the portable terminal, then the portable terminal returns to step 301. Otherwise, if it is determined that the peer terminal has the right to set the alarm, then the portable terminal proceeds to step 307, and the portable terminal determines whether an alarm emoticon included in the received message is an emoticon in which an alarm time is designated.

If the alarm emoticon does not designate the alarm time, then, in step 309, the portable terminal determines an alarm generation time by using the message transmission time and a response time of a message transmitted and received with respect to the peer terminal. For example, the portable terminal calculates the response time, that is, a time required until the portable terminal transmits a response message in response to a message received from the peer terminal from among pre-stored messages transmitted and received with respect to the peer terminal, and thereafter determines the alarm generation time by adding the calculated response time to the message transmission time. In this case, if the portable terminal transmits and receives the message several times with respect to the peer terminal, then the portable terminal calculates an average response time for the message that is transmitted and received several times, and thus may determine the alarm generation time by adding the average response time to the message transmission time.

Otherwise, if the alarm emoticon designates the alarm time, then, in step 311, the portable terminal determines the alarm generation time by using a transmission time of the received message and the alarm time designated by the alarm emoticon. For example, as illustrated in FIG. 4, if a user-B terminal receives a message including a 5-minute alarm emoticon, then the user-B terminal sets the alarm generation time by adding 5 minutes to a time at which a user-A terminal transmits the message. Herein, it is apparent that the message transmission time can be confirmed from the received message.

In step 313, the portable terminal sets an alarm for the determined alarm generation time. In step 315, the portable terminal determines whether it is the alarm generation time. If it is not the alarm generation time, then, in step 317, the portable terminal determines whether a message response operation is performed according to the user control. For example, the portable terminal determines whether an operation of confirming, by the user, the received message or an operation of creating and transmitting a response message in response to the received message is performed.

If the message response operation is not performed in step 317, then, the portable terminal returns to step 315. Otherwise, if the message response operation is performed in step 317, then the portable terminal, in step 319, cancels the alarm that was set in step 313, and then the procedure of FIG. 3 ends.

Otherwise, if it is the alarm generation time, as determined in step 315, then the portable terminal proceeds to step 321, and generates an alarm. For example, as illustrated in FIG. 4, the user-B terminal generates an alarm when 5 minutes, i.e., a time indicated by the alarm emoticon, elapse from a time at which a message including the alarm emoticon is received. In this case, the alarm may be a pre-set audio signal or vibration. Furthermore, if the received message includes an emoticon other than the alarm emoticon, then the portable terminal may output an audio signal pre-set for the emoticon or may display an image pre-set for the emoticon. Furthermore, the portable terminal may automatically execute an application that is pre-set for the emoticon. Thereafter, the procedure of FIG. 3 ends.

Although an emoticon is used for an alarm setting in the present exemplary embodiments, the present invention is not limited thereto, and it is also possible to use symbols, such as agreed signs, numbers, icons, images, and other similar graphically displayable items, and characters rather than or in conjunction with the emoticon. For example, to set a 5-minute alarm in which an alarm is generated 5 minutes later from a message transmission time, various text-type symbols, such as "(5-minute alarm)", "\5 minutes\", "/5 minutes/", and "☆5", may be pre-agreed with the peer terminal, and thereafter the agreed symbols may be used.

In addition, although it has been described above that the alarm generation time is determined on the basis of the message response time only when the alarm emoticon does not designate the alarm time, the present invention is not limited thereto, and a method of determining the alarm generation time may change variously depending on a design rule. For example, if the alarm emoticon indicates a time interval as the alarm time, then the alarm generation time may be determined by adding the message response time and the time interval to the message transmission time. That is, in the present invention, the alarm generation time may be determined by using at least one of a transmission time or reception time of an alarm setting request message, a time designated by an alarm emoticon, and a response time of the message.

In addition, it has been described above that the portable terminal sets an alarm according to an alarm setting request of a peer terminal, and thereafter the set alarm is canceled when a pre-set operation, such as a corresponding message confirmation or response message transmission, is performed according to the user control. However, the present invention is not limited thereto, and the portable terminal may generate the alarm at a designated alarm generation time without having to cancel the set alarm, even if the pre-set operation is performed according to the user control.

In the present exemplary embodiments, a first portable terminal transmits a message for requesting an alarm setting to a second portable terminal and the second portable terminal sets an alarm on the basis of the alarm setting request message. Therefore, the second portable terminal may set an alarm without an additional user control. Accordingly, the present exemplary embodiments allow for an alarm to be set by using a portable terminal of another user, even in a situation where the user may not recognize a schedule or when it is difficult to set an alarm for the schedule. In addition, since an alarm setting is requested by simply selecting an emoticon, the present exemplary embodiments also provide an alarm that may be easily set without having to prepare an additional module.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for setting an alarm in a portable terminal, the method comprising:

receiving a message for requesting the setting of the alarm from a peer terminal;

confirming a right of the peer terminal to set an alarm;

determining, if the peer terminal has the right to set the alarm, an alarm generation time according to a transmission time of the alarm setting request message; and setting the alarm for the alarm generation time.

2. The method of claim 1, wherein the determining of the alarm generation time according to the transmission time of the alarm setting request message comprises:

calculating a response time for a message previously transmitted and received with respect to the peer terminal; and determining the alarm generation time by adding the response time to a transmission time of the alarm setting request message.

3. The method of claim 2, wherein the calculating of the response time comprises calculating an average time required until the portable terminal transmits a response message in response to a message received from the peer terminal from among pre-stored messages transmitted and received with respect to the peer terminal.

4. The method of claim 1, wherein the determining of the alarm generation time according to the transmission time of the alarm setting request message comprises:

determining whether the alarm setting request message indicates an alarm time interval; and determining, if the alarm setting request message indicates the alarm time interval, the alarm generation time by adding the alarm time interval to a transmission time of the alarm setting request message.

5. The method of claim 1, wherein the confirming of the right of the peer terminal to set the alarm comprises:

determining whether a number of times of transmitting and receiving a message, with respect to the peer terminal, is greater than or equal to a threshold count; and determining, if the number of times of transmitting and receiving the message, with respect to the peer terminal, is greater than or equal to the threshold count, that the peer terminal has the right to set the alarm, and if the number of times of transmitting and receiving the message, with respect to the peer terminal, is less than the threshold count, determining that the peer terminal does not have the right to set the alarm.

6. The method of claim 1, further comprising:

after setting the alarm, determining whether an alarm cancel operation is performed before the alarm generation time; and canceling the set alarm when the alarm cancel operation is performed before the alarm generation time, wherein the alarm cancel operation includes at least one of an operation of confirming, by a user, the alarm setting request message and an operation of transmitting a response message in response to the alarm setting request message.

7. The method of claim 1, wherein the message for requesting an alarm setting includes a symbol pre-set for the alarm setting, and wherein the symbol includes at least one of an emoticon, a sign, a number, and a character.

8. The method of claim 1, further comprising:

determining whether the message for requesting an alarm setting includes a symbol for indicating at least one of an emotion and a weather; and outputting, if the symbol for indicating at least one of the emotion and the weather is included, an audio signal or image corresponding to the emotion and the weather at a time at which the set alarm is generated.

9. A method of requesting an alarm setting in a portable terminal, the method comprising:

determining whether an alarm setting function is selected while operating in a message input mode;

displaying, if the alarm setting function is selected, at least one symbol pre-set for the alarm setting;

selecting at least one symbol according to a user control; and transmitting a message including the selected symbol to a peer terminal, wherein the symbol pre-set for the alarm setting indicates at least one of an alarm time interval and an alarm generation time.

10. An apparatus for setting an alarm in a portable terminal, the apparatus comprising:

a transceiver for receiving a message for requesting the setting of the alarm from a peer terminal; and a controller for confirming a right of the peer terminal to set the alarm, and if the peer terminal has the right to set the alarm, for determining an alarm generation time according to a transmission time of the alarm setting request message, and for setting the alarm for the alarm generation time.

11. The apparatus of claim 10, wherein the controller calculates a response time for a message previously transmitted and received with respect to the peer terminal, and determines the alarm generation time by adding the response time to a transmission time of the alarm setting request message.

12. The apparatus of claim 11, wherein the controller calculates an average time required until the portable terminal transmits a response message in response to a message received from the peer terminal from among pre-stored messages transmitted and received with respect to the peer terminal.

13. The apparatus of claim 10, wherein the controller determines whether the alarm setting request message indicates an alarm time interval, and if the alarm setting request message indicates the alarm time interval, the controller determines the alarm generation time by adding the alarm time interval to the transmission time of the alarm setting request message.

14. The apparatus of claim 10, wherein the controller determines whether a number of times of transmitting and receiving a message, with respect to the peer terminal, is greater than or equal to a threshold count, and if the number of times of transmitting and receiving the message, with respect to the peer terminal, is greater than or equal to the threshold count, the controller determines that the peer terminal has the right to set the alarm, and if the number of times of transmitting and receiving the message, with respect to the peer terminal, is less than the threshold count, the controller determines that the peer terminal does not have the right to set the alarm.

15. The apparatus of claim 10, wherein after the setting of the alarm, the controller determines whether an alarm cancel operation is performed before the alarm generation time, and the controller cancels the set alarm when the alarm cancel operation is performed before the alarm generation time, and wherein the alarm cancel operation includes at least one of an operation of confirming, by a user, the alarm setting request message and an operation of transmitting a response message in response to the alarm setting request message.

16. The apparatus of claim 10, wherein the message for requesting an alarm setting includes a pre-set symbol for the alarm setting, and wherein the symbol includes at least one of an emoticon, a sign, a number, and a character.

17. The apparatus of claim 10, wherein the controller determines whether the message for requesting an alarm setting includes a symbol for indicating at least one of a emotion and a weather, and if the symbol for indicating the at least one of the emotion and the weather is included, the controller outputs an audio signal or image corresponding to the emotion and the weather at a time at which the set alarm is generated.

18. An apparatus for requesting an alarm setting in a portable terminal, the apparatus comprising:

a controller for determining whether an alarm setting function is selected while operating in a message input mode, and for selecting, if the alarm setting function is selected while operating in the message input mode, at least one symbol according to a user control by displaying at least one symbol pre-set for the alarm setting; and a transceiver for transmitting a message including the selected symbol to a peer terminal under the control of the controller, wherein the symbol pre-set for the alarm setting indicates at least one of an alarm time interval and an alarm generation time.

* * * * *